Figure 1:
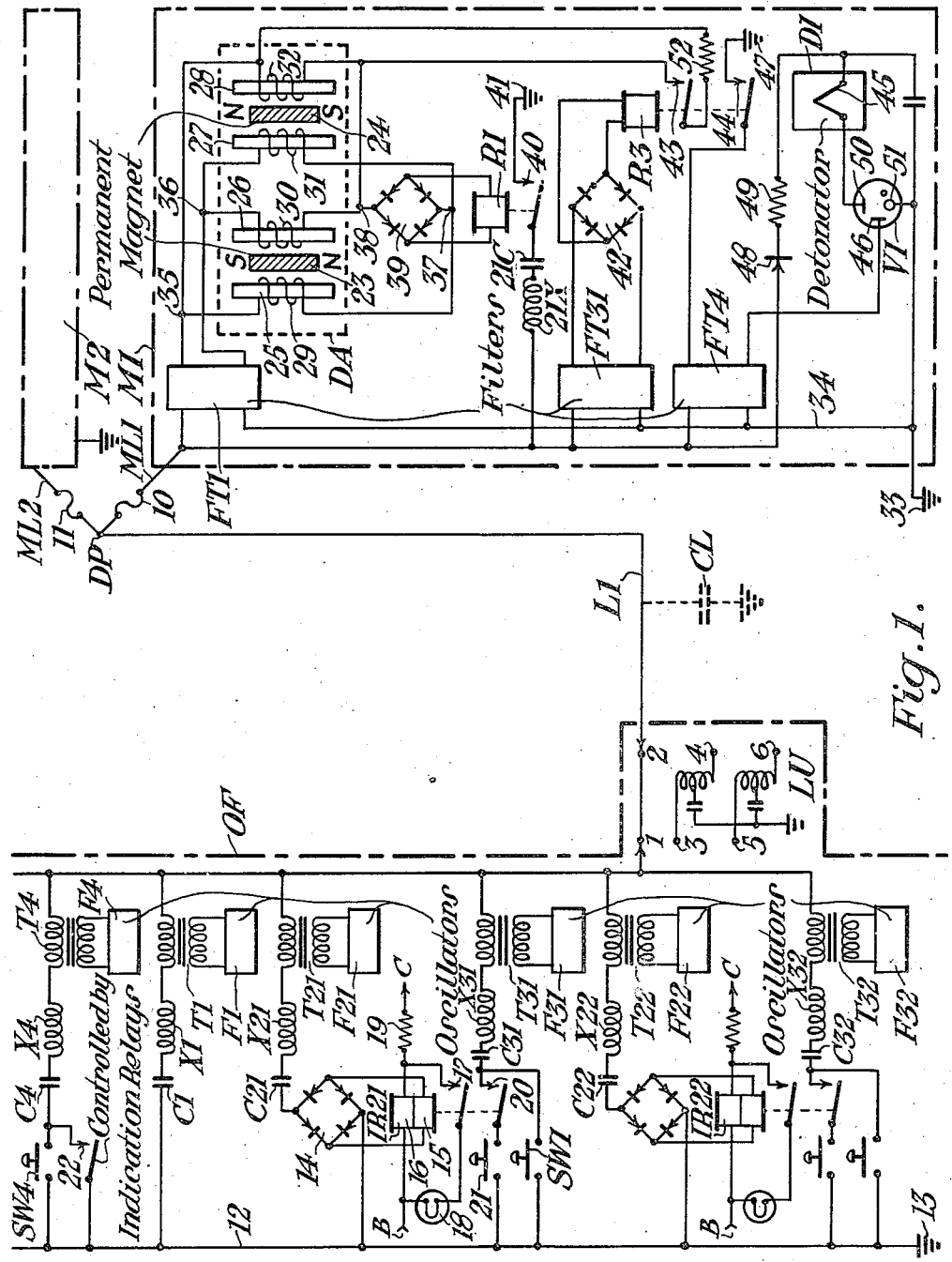

Oct. 22, 1946.        A. J. SORENSEN        2,409,719
APPARATUS FOR SELECTIVE CONTROL AND INDICATION SYSTEMS
Filed Oct. 27, 1943         2 Sheets-Sheet 1

INVENTOR
Andrew J. Sorensen.
BY
HIS ATTORNEY

Patented Oct. 22, 1946

2,409,719

UNITED STATES PATENT OFFICE 2,409,719

APPARATUS FOR SELECTIVE CONTROL AND INDICATION SYSTEMS

Andrew J. Sorensen, Edgewood, Pa., assignor to The Union Switch & Signal Company, Swissvale, Pa., a corporation of Pennsylvania Application October 27, 1943, Serial No. 507,877

4 Claims. (Cl. 177—353)

My invention relates to apparatus for selective control and indication systems, and more particularly to apparatus to indicate at which one of a plurality of devices a given condition occurs and to control that device in response to such indication.

Individual control and indication of a group of devices or electric equipments is frequently accomplished through a single line circuit by use of alternating currents of different frequencies. In such systems reliability of selection, simplicity of apparatus and circuits, freedom from operation due to shock excitation and foreign current and the resetting and testing of the apparatus are essential features.

Accordingly, a feature of my invention is the provision of improved apparatus to selectively control and indicate the conditions of a relatively large group of devices.

Another feature of my invention is the provision of novel and improved apparatus to detect magnetic fields and the presence of magnetizable bodies and to indicate at a remote point such detection.

Still another feature of my invention is the provision of indicating apparatus of the type here involved incorporating novel means for automatically maintaining a preselected adjustment and balance of the apparatus over a long period of time.

Again, a feature of my invention is the provision of indicating apparatus of the type here contemplated incorporating novel means wherewith an unbalance and change in the working value of current are avoided when changes take place in the voltage of the current source.

A specific feature of my invention is the provision in control and indication systems for submarine mine fields of improved apparatus to detect the approach of a vessel and to indicate at a shore office which mine of the field is approached.

A further specific feature of my invention is the provision of improved apparatus for selective indication, control and firing of the mines of a submarine mine field, and wherewith all current sources are located at a shore office.

Also a feature of my invention is the provision of novel and improved firing apparatus for submarine mines incorporating novel means wherewith the probability of the firing of a mine due to energy from an improper source or to shock excitation or to variations in the voltage of the supply source is minimized.

Other features, objects and advantages of my invention will appear as the specification progresses.

The above features, objects and advantages embodying my invention are accomplished through a novel line circuit arrangement, an improved indication apparatus and control means for each of a plurality of electric equipments or devices, and a plurality of oscillators of different frequencies located at a control office remote from the devices.

The line circuit is a two conductor circuit extending from the central office to the different devices in multiple, the circuit may comprise two metallic conductors or one metallic conductor and the ground path. This line circuit is proportioned to have the characteristics of a circuit of a predetermined length. For locations where the distance between the office and the devices is less than such predetermined length sufficient artificial impedance is inserted in the line conductors to provide the line circuit with the characteristics of the circuit of predetermined length.

The indication apparatus for each device includes an oscillator, filter and relay means at the office, and a detector-amplifier and shunt circuit at the device. The indication oscillator is of a frequency preselected to be individual to the device, and it is connected to the line circuit through the respective filter and relay means. The filter is proportioned for the circuit including the oscillator, filter, relay means and the distributed capacitance of the line conductors with respect to ground to be tuned to resonance at the frequency of the oscillator. In this way the oscillator normally supplies a relatively large line charging or leakage current. Also the several indication oscillators, one for each device, can be connected in multiple across the line circuit with each functioning independently of the others. The relay means is the differential type, such as, for example, a two winding neutral relay. One winding is interposed in the connection of the oscillator through a full wave rectifier and a given energization of the relay is effected by the normal charging current. The second winding is connected to a local battery to provide an energization that is opposite and substantially equal to that normally created by the first winding and the resultant energization of the relay is approximately zero. A preselected reduction in the charging current will be followed by a corresponding reduction of the energization of the first winding with the result the resultant energization of the relay will be increased and the relay will be picked up to control an indicator or any other circuit. Such reduction is at times effected in a manner to appear shortly.

Each detector-amplifier of the indication apparatus is designed to respond to a magnetic field and includes two magnetic cores of like construction and arranged in parallel relation with like windings mounted one on each core. Two like magnets, preferably permanent magnets, are disposed one along side of each of said cores to create magnetic fluxes of the same density in each core so that the impedances of the windings are the same. The two magnets are poled oppositely so that fluxes thread the two cores in opposite directions. The windings of these two cores are connected to a source of alternating current and substantially equal currents flow in the windings due to their impedances being equal. I may provide an adjustable reactance in the connection to these windings as an aid in equalizing the normal value of current flowing therethrough. These two windings of the detector element are included in different branches of a balanced circuit network, preferably of the bridge circuit type. A relay is connected to this circuit network to be operated when an unbalanced condition is created and unequal currents are made to flow in the detector windings.

An extraneous magnetic field about this detector element or the approach of a magnetizable body near the element tends to add to the flux threading one core and to subtract from that threading the other core. Such a change of the magnetic fluxes causes variations in the impedances of the two windings and in turn in the value of the currents flowing therethrough, and the relay is operated by such unbalanced condition. Preferably, the arrangement is such that as long as the currents flowing in the two windings are equal, the relay is deenergized, but that an unbalanced condition of the currents causes the relay to become energized.

In one form of the invention the balanced circuit network is a bridge circuit of the well-known Wheatstone Bridge arrangement. The two windings of the detector element form two branches of this bridge circuit, and two other windings constructed to be like the detector element windings and mounted one on each of two other like cores disposed one adjacent one magnet of the detector element and one adjacent the other magnet of the detector element, form the other two branches of the bridge circuit. That is, the four arms of this bridge are as nearly the same as possible and have equal values of current flowing therethrough under the balanced condition. The relay is preferably a direct current relay connected across opposite corners of this bridge circuit through a full wave rectifier.

In another form of the invention, the two windings of the detector element are included one in each of two balanced detector circuits to which an output circuit is connected in such a manner that the current flowing in the output circuit is proportional to the difference between the currents flowing in the detector circuits. This output circuit includes two windings, one mounted on the center leg of each of two saturable reactors each of which reactors has a three-legged core structure, and current flowing in this output circuit governs the flux density of the core structure of each reactor. Each of these reactors is provided with a balanced reactor circuit which comprises alternating current windings mounted one on each of the outside legs of the core structure, a rectifier and a direct current regenerative winding on the center leg of the core. These two reactor circuits are adjusted for the currents flowing therethrough to be as nearly the same as possible, but they become unbalanced when current flows in the windings of the previously mentioned output circuit, because one winding of the output circuit biases the reactance of its core in one sense and the other winding of the output circuit biases the reactance of its core in the opposite sense. The detector relay is connected to these two balanced reactor circuits to be deenergized under the normal balanced condition and to become energized due to an unbalanced condition between the currents flowing in the reactor circuits. It follows that in both forms of the invention the detector relay is deenergized when no extraneous magnetic field or magnetizable body is present, but becomes energized in response to the presence of a magnetic field or magnetizable body.

Each shunt or selector circuit includes a filter and is connected across the line circuit through a front contact of the detector relay governed by the respective detector-amplifier, and each such filter is tuned to resonance at the frequency of the indication oscillator for the same device. Thus, when a detector relay is operated and the respective shunt circuit is connected across the line circuit, the line circuit is detuned for that particular indication frequency and the magnitude of the charging or indication current supplied by the respective oscillator is materially reduced. Such reduction in the indication current correspondingly reduces the energization of the first winding of the respective indication relay and that relay is operated or picked up due to the energization of the local or second winding of the relay as explained hereinbefore. By the filter of each shunt circuit being tuned to resonance at the frequency of the respective indication oscillator, each shunt circuit when closed causes little or no change in the normal charging or indication current supplied to the line circuit by the other indication oscillators.

A power oscillator at the office is permanently connected to the line circuit to supply a power current of a given preselected frequency. Each detector-amplifier has a supply circuit connected to the line circuit through a filter tuned to pass current only of the frequency of the power oscillator.

The office is further provided with an operating oscillator common to the group of electric equipments or devices, and an individual control oscillator for each equipment. The operating oscillator is of a distinctive preselected frequency and each control oscillator supplies current of a frequency preselected to be individual for the respective equipment. The office is provided with switching means that permits the operating oscillator and any one or any group of the control oscillators to be connected to the line circuit.

The control and operating means of each equipment includes a control relay connected to the line circuit through a filter tuned to pass current only of the frequency of the respective control oscillator. The operating unit of each equipment is connected across the line circuit through a contact of the associated control relay and a filter tuned to pass current only of the frequency of the operating oscillator. In this way, control current and operating current are required for operation of an equipment and the probability of operation of an equipment due to an extraneous current is remote.

Each control relay governs a circuit for unbalancing the condition of the detector-amplifier for test purposes. I also provide each detector-amplifier with circuit arrangements for automatically adjusting its balanced condition and an unbalanced condition of its circuits due to variations in the source of supply, as well as variations due to other causes, is avoided.

I shall describe two forms of apparatus embodying my invention, and shall then point out the novel features thereof in claims.

Figure 2:
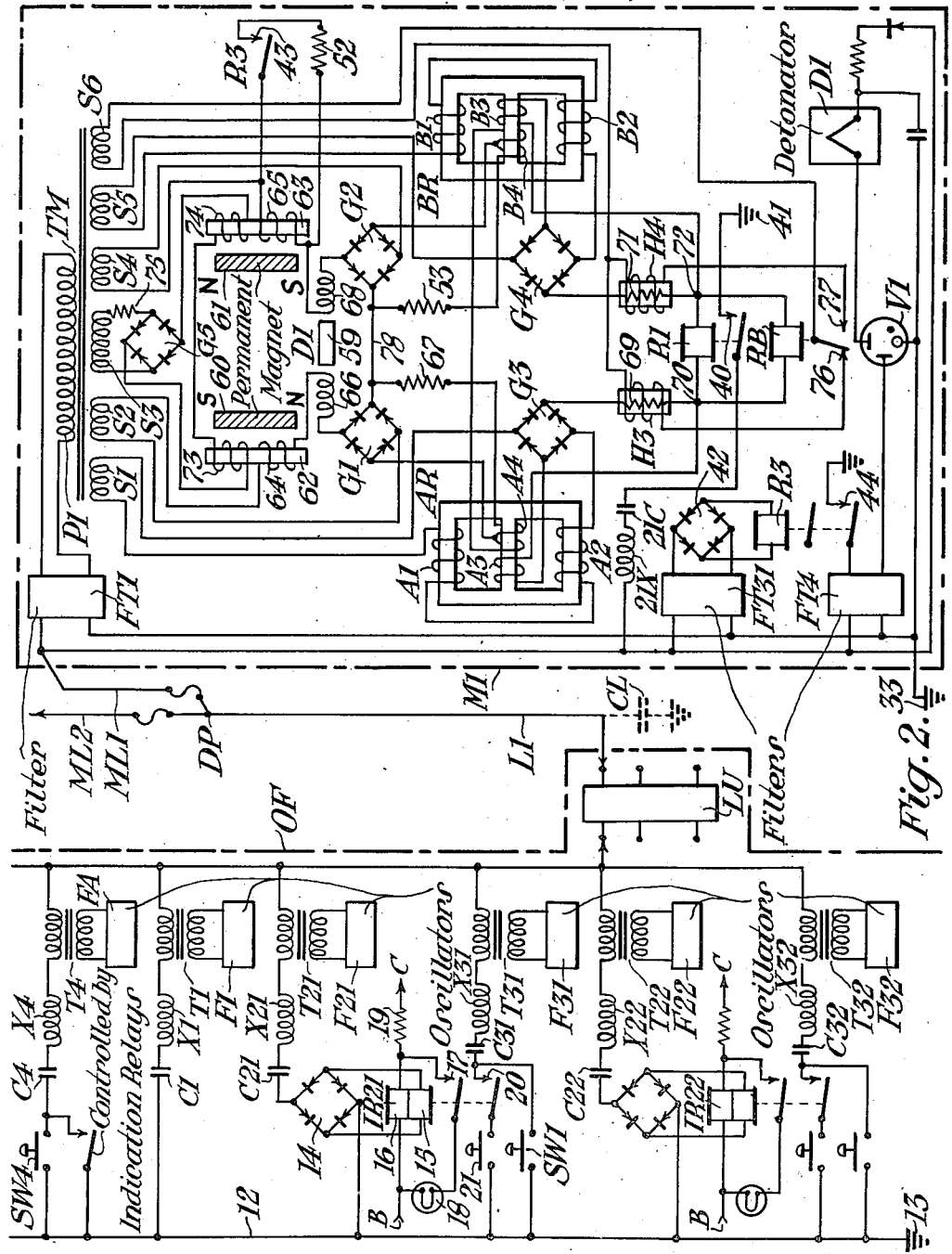

In the accompanying drawings, Figs. 1 and 2 are diagrammatic views showing a first and a second form, respectively, of apparatus embodying my invention when used to control and indicate the mines of a submarine mine field.

In each of the two views like reference characters are used to designate similar parts.

It is understood that the invention is not limited to submarine mine fields, and this one application serves to illustrate the principle of the invention.

Referring to Fig. 1, the reference characters M1 and M2 designate a first and a second mine, respectively, of a submarine mine field which would include a sufficient number of mines to properly protect a harbor. Only the two mines are shown since the mines are alike and two are sufficient to fully illustrate my invention.

The reference character OF designates a shore office in the vicinity of the harbor protected by this mine field, and from which office the mines are controlled and fired. A transmitting or line circuit is provided between the office OF and the mines. Preferably this line circuit is a two conductor circuit comprising a single conductor cable L1 as one side of the circuit and the ground path as the other side of the circuit, although a metallic conductor may be used in place of the ground path. The conductor L1 extends from the office to a distribution point DP located in a waterproof housing anchored in the harbor and from which distribution point the line circuit extends through cables in multiple to each mine, single conductor cables ML1 and ML2 extending from distribution point DP to mines M1 and M2, respectively. Fuses 10 and 11 are interposed in the conductors ML1 and ML2, respectively, at the distribution point, for reasons to appear hereinafter.

This line conductor L1 possesses distributed capacitance with ground and to visualize such capacitance a condenser CL is shown by dotted lines in Fig. 1 as connected between the conductor L1 and ground but it is to be understood condenser CL represents no physical piece of apparatus. The distributed capacitance of line conductor L1 as well as its impedance will vary for different lengths and other conditions. Preferably the line circuit is arranged for the distributed capacitance and impedance to be that for a predetermined length of line, such as, for example, eight miles. To take care of cases where the conductor L1 is less than the predetermined length, the office is provided with a unit LU including resistance, inductance and capacitance and having two mating series of terminals 1—2, 3—4 and 5—6 with which conductor L1 and the office connection can be connected to insert sufficient impedance to give the line circuit the impedance equal to that of the predetermined length.

The office apparatus includes a number of different oscillators, some of which are permanently connected across the line circuit, and others of which are connected to the line circuit only at times. These oscillators may be of any of the well-known types and they are shown conventionally for the sake of simplicity. Each oscillator is constructed to supply current of a preselected frequency which is different for each oscillator, and preferably each oscillator is normally active. For example, an oscillator F1 is connected across the line wire L1 and a wire 12 connected to a ground electrode 13 through a transformer T1 and a filter comprising a reactor X1 and a condenser C1. Oscillator F1 delivers a power current to the line circuit for supplying power to the equipments of the mines to be described hereinafter. This power current is of a preselected frequency, and which frequency I shall call frequency $f1$. Filter X1—C1 is tuned to pass current of the frequency of $f1$, and to substantially suppress all other frequencies. It follows that the line circuit is excited at all times by this power current.

Oscillators F21 and F22 are indication oscillators for mines M1 and M2, respectively, and each of these indication oscillators supplies an indication current of a frequency made individual for the respective mine, and I shall refer to the frequencies of oscillators F21 and F22 as being of the frequencies $f21$ and $f22$, respectively. Oscillator F21 is connected across the line circuit through a transformer T21, a filter comprising a reactor X21 and a condenser C21, and a full wave rectifier 14, an indication relay IR21 having one winding 15 connected to the direct current terminals of the rectifier 14.

The filter X21—C21 is proportioned so that the circuit comprising transformer T21, filter C21—X21, winding 15 of relay IR21 and line conductor L1 with its distributed capacitance is tuned to resonance at the frequency of oscillator F21, and oscillator F21 normally supplies a relatively large line charging current. Winding 15 of relay IR21 is thus normally energized by this charging current. Indication relay IR21 is provided with a second winding 16 connected to a convenient source of current, such as a battery, the terminals of which are indicated at B and C. Windings 15 and 16 oppose each other and are proportioned so that when the normal charging current flows in winding 15 the resultant energization is substantially zero and no tractive effort is exerted on the armature of the relay, but when the charging current flowing through winding 15 decreases the resultant energization is increased and the relay picked up to close front contacts 17 and 20. With front contract 17 closed, an indicator lamp 18 is illuminated from the B—C current source. A resistor 19 is preferably included in the connection to the battery to aid in adjustment of relay IR21.

Indication oscillator F22 is connected to the line circuit through a transformer T22 and a filter X22—C22 and controls an associated indication relay IR22 in the same manner that oscillator F21 controls the relay IR21, and the description need not be repeated except to point out that the circuit comprising transformer T22, filter X22—C22, relay IR22 and line conductor L1 with its distributed capacitance is tuned to resonance at the frequency $f22$ and oscillator F22 normally supplies a relatively large line charging current.

Oscillators F31 and F32 are control or arming oscillators for mines M1 and M2, respectively, and each of these oscillators supplies current at a frequency preselected to be individual for the respective mine, and I shall asume that oscillators F31 and F32 supply current of the frequencies $f31$ and $f32$, respectively. Oscillator F31 is connected across the line circuit through a transformer T31, a filter comprising a reactor X31 and a condenser C31, and two alternative paths, one of which includes a manually operable switch SW1, and the other of which paths includes front contact 20 of indication relay IR21 and a switch 21. The filter X31—C31 is tuned to pass current of the frequency $f31$ and to suppress other frequencies. Hence, when either the switch SW1 is closed or the switch 21 is closed and relay IR21 is picked up to close front contact 20, control current suitable for controlling or arming mine M1 is supplied to the line circuit. As will appear hereinafter, the closing of switch 21 conditions the office apparatus for automatically arming the mine M1 in response to the approach of a vessel to that mine, but when switch 21 is open, the mine M1 is armed manually through switch SW1 in response to such indication. Control oscillator F32 is connected to the line circuit in a manner similar to oscillator F31, as will be clear by an inspection of Fig. 1, a transformer T32 and a filter comprising reactor X32 and condenser C32 being interposed in the connection of oscillator F32, and filter X32—C32 being tuned to pass current only of the frequency $f32$.

An operating or firing oscillator F4 at the office supplies current that is used for firing the mines, and which current is of a preselected frequency different from that of the other oscillators, and which frequency I shall assume to be $f4$. Oscillator F4 is connected across the line circuit through a transformer T4, a filter comprising a reactor X4 and a condenser C4 and two alternative paths, one of which includes a manually operable switch SW4 and the other of which paths includes a contact 22 controlled by the indication relays of the system. It is to be noted that the office is provided with an indication oscillator and a control oscillator for each mine of the mine field, but that the oscillators F1 and F4 are common for the field.

Each mine is provided with an electric equipment that has an indication portion which detects and indicates the approach of a vessel, and a control portion which arms and fires the mine. These mine equipments are alike, except for the tuning thereof and a description of one equipment will suffice for an understanding of all. Referring to mine M1, its equipment comprises as essential elements, a detector-amplifier DA, a detector relay R1, a control and arming relay R3 and a detonator D1, together with filters and circuit connections.

The detector-amplifier DA includes two permanent bar magnets 23 and 24 made as nearly alike as possible. These magnets are arranged parallel to each other and are oppositely directed as indicated by the letters N and S placed on their poles. Two magnetizable cores of the bar type are disposed alongside each of the permanent magnets, cores 25 and 26 being thus associated with magnet 23 and cores 27 and 28 being associated with magnet 24. These cores are made as nearly alike as possible of material of very high permeability, such as Permalloy, and the cores are spaced as nearly the same as possible with respect to their magnets. It is clear that magnetic flux from magnet 23 threads cores 25 and 26, and magnetic flux from magnet 24 threads cores 27 and 28, and density of such fluxes being substantially the same in each core due to the similarity of the magnets and size and spacing of the cores. The fluxes threading cores 25 and 26 are, however, of the opposite direction from those threading the cores 27 and 28. Windings 29, 30, 31 and 32 are placed on cores 25, 26, 27 and 28, respectively, and these windings are made as nearly alike as possible. It follows that the impedances of the windings are almost if not wholly identical.

Windings 29, 30, 31 and 32 are connected to form a bridge circuit of which windings 29 and 31 form one parallel path and windings 30 and 32 form the other parallel path connected between terminals 35 and 36 of a current source. Terminals 35 and 36 are the output terminals of a filter FT1, the input terminals of which are connected across the line circuit by one input terminal being connected to conductor ML1 and the other input terminal being connected to ground electrode 33 through wire 34. Filter FT1 is tuned to pass current only of the frequency $f1$ and hence current from power oscillator F1 is applied to the windings of the detector at the opposite corners of the bridge circuit. Detector relay R1 is connected across the other opposite terminals 37 and 38 of the bridge circuit through a full wave rectifier 39. It is apparent that normally the relay R1 is de-energized because of the balanced condition of the bridge circuit.

If a vessel approaches mine M1, the presence of its steel portions creates a magnetic field that is substantially uniform and is of a given direction. This extraneous field causes the fluxes threading cores 25 and 26 to be decreased and the fluxes threading cores 27 and 28 to be increased or vice versa, and consequently the two opposite arms of the bridge, windings 29 and 30 for example, have their impedances increased, and the other opposite arms of the bridge, windings 31 and 32, have their impedances decreased or vice versa. This results in an unbalanced condition for the bridge circuit and relay R1 is energized due to the difference in potential between the terminals 37 and 38. It is clear, therefore, that windings 29 and 31, for example, with their respective cores 25 and 27, together with permanent magnets 23 and 24 form a detector element that is influenced by a magnetic field and which detector element in conjunction with the other windings and cores of the bridge circuit, provide high sensitivity in the control of relay R1.

Detector relay R1 controls a shunt or selector circuit path connected across the line circuit, and which circuit path extends from conductor ML1 through a filter comprising a reactor 21X and a condenser 21C, and front contact 40 of relay R1 to ground electrode 41. The filter 21X—21C is tuned to pass current only of the frequency $f21$, that is, it is tuned to resonance of the frequency of the current supplied to the line circuit by the indication oscillator F21 associated with mine M1. Consequently, when a vessel approaches mine M1, to bring about energization of relay R1, the circuit path including filter 21X—21C is connected across the line circuit. The connecting of the shunt circuit across the line circuit detunes the line circuit as far as oscillator F21 is concerned and the current supplied by oscillator F21 is materially reduced, for example, fifteen per cent or more. This reduces the energization of winding 15 of relay IR22 and the relay is picked up due to local winding 16, with the result the indicator lamp 18 is illuminated to indicate to the office operator the approach of the vessel to the mine M1.

Arming relay R3 is connected across the line circuit through a filter FT31, relay R3 being a direct current relay connected to the output side of the filter through a rectifier 42 and the input side of filter FT31 being connected to conductor ML1 and ground electrode 33. Filter FT31 is tuned to pass current only of the frequency f31. Consequently, when control oscillator F21 is connected across the line circuit by the closing of switch SW1 or by the closing of switch 21 and front contact 20 of indication relay IR21, the control relay R3 at mine M1 is energized and picked up to close its front contacts 43 and 44.

The detonator D1 is of the usual type and includes an element 45 which when supplied with current of a given value is effective to fire the mine. Detonator D1 is connected to the line circuit through a gas filled tube V1 which in turn is excited through a filter FT4. Filter FT4 has its input side connected between conductor ML1 and ground electrode 33 of the line circuit, and its output side connected between control electrode 46 of tube V1 and ground electrode 47, the front contact 44 of control relay R3 being interposed in the connection to ground electrode 47. Filter FT4 is tuned to pass current only of the frequency f4, and hence when firing oscillator F4 is connected to the line circuit by the closing of switch SW4 or by the closing of contact 22, and the control relay R3 is picked up to close its front contact 44, the electrode 46 of tube V1 is excited. At the same time, a voltage due to the power current is impressed across anode 50 and cathode 51 of tube V1, anode 50 being connected to the conductor ML1 through element 45 of the detonator D1, resistor 49 and a rectifier 48; and cathode 51 being connected to ground electrode 33. With both control electrode 46 and anode 50 thus excited, the tube V1 breaks down and becomes conductive so that current flows through the tube and this current flowing in the element 45 of the detonator is sufficient to cause the firing of the mine.

Mine M2 is shown conventionally only since its equipment would be a duplication of the equipment for mine M1, except for the tuning of the shunt circuit connected across the line circuit through a contact of the respective detector relay and the tuning of the filter through which the arming relay is connected to the line circuit.

In describing the operation of the apparatus of Fig. 1, I shall assume that normally, that is, when no vessel is in the vicinity of the mine field, the apparatus occupies the condition disclosed in the drawings. With the apparatus in its normal condition and a vessel approaches mine M1, the detector-amplifier DA is unbalanced in response to the magnetic field created due to the vessel and the detector relay R1 is picked up to connect the associated shunt circuit path across the line circuit. This causes a sudden decrease in the charging or indication current supplied to the line circuit from indication oscillator F21, and indication relay IR21 is picked up by its resultant energization due to its local winding and lamp 18 is illuminated to inform the office operator of the approach of the vessel to mine M1.

On the assumption that manual firing of the mine is relied upon, the operator, if he desired to fire the mine in response to this indication, would close switches SW1 and SW4 to bring about the supply of arming current and firing current to the line circuit simultaneously. With both such currents on the line circuit, the arming relay R3 for mine M1 is picked up, after which the tube V1 is rendered conductive and the detonator D1 is fired.

If automatic firing of the mine is to be effected, the switch 21 would be set at its closed position. Then when indication relay IR21 is picked up in response to the approach of the vessel to mine M1, the closing of contacts 20 and 22 completes the connections for oscillators F21 and F4 to the line circuit, and the mine M1 is fired in response to the presence of control current and firing current simultaneously.

With mine M1 fired, the mine end of the conductor ML1 becomes grounded, due to the rupture of the conductor, and the increase of power current flowing through the fuse 10 causes the fuse to blow so that the line circuit is disconnected from the conductor ML1 to the fired mine.

The detecting of a vessel approaching any one of the other mines of the field, and the indication of such detection, together with the arming and firing of the mine, would be accomplished in a manner similar to that just described for mine M1.

If the equipment for mine M1 is to be tested, the operator would close switch SW1 with switch 21 open. This would connect the arming oscillator F31 to the line circuit so that the arming relay R3 would be energized. The closing of front contact 43 of relay R3 completes a shunt circuit across winding 32 of the bridge circuit through front contact 43 and a resistor 52. This shunt circuit causes an unbalanced condition of the bridge circuit, and detector relay R1 is energized to connect the associated shunt circuit path across the line circuit so that the indication current supplied by oscillator F21 is decreased to bring about the picking up of indication relay IR21, and lamp 18 becomes illuminated to indicate to the operator that the equipment at mine M1 is in an operative condition.

In Fig. 2, mine M1 is one mine of a mine field defending a harbor, and which mine field is connected to a shore office OF through a line circuit including conductor L1 and the ground path, the same as in Fig. 1. The office apparatus of Fig. 2 is the same as that of Fig. 1, and that part of the description need not be repeated. Each mine of Fig. 2 is provided with an electric equipment to detect the approach of a vessel and to arm and fire the mine the same as in Fig. 1 and the mine equipments of Fig. 2 are all alike except as to their tuning, and are the same as the mine equipments of Fig. 1, except for the detector-amplifier.

In describing the detector-amplifier of mine M1 of Fig. 2, it is to be noted that power for this device is supplied from the power oscillator F1 through filter FT1 connected across the line circuit at the mine, and a transformer TM having a primary winding P1 connected to the output terminals of the filter, and a series of secondary windings designated S1 to S6, inclusive, to which secondary windings the circuits for the detector-amplifier are connected. The detecting element includes two permanent bar magnets 60 and 61 disposed parallel and oppositely directed, and which are made as nearly alike as possible. Two cores 62 and 63 of material of high permeability are disposed alongside of magnets 60 and 61, respectively, and these cores are as nearly alike as possible and are spaced as nearly the same as possible with respect to their magnets. Windings 64 and 65 are mounted on cores 62 and 63, respectively, and these windings are as nearly alike as possible. Thus it is clear that windings 64 and 65 are of like impedances. Each of the windings 64 and 65 is included in a detector circuit, the two circuits of which are balanced. One such detector circuit can be traced from one terminal of secondary winding S2 of transformer TM through winding 64, a first winding 66 of an adjustable reactance D1, one leg of a full wave rectifier G1, resistor 67, a right-hand portion of a winding A4 of a saturable reactor AR to be described later, and a second leg of rectifier G1 to the other terminal of secondary winding S2. Similarly, another detector circuit can be traced from one terminal of secondary winding S4 of transformer TM, through winding 65, winding 68 of the adjustable reactance D1, one leg of a full wave rectifier G2, resistor 53, left-hand portion of a winding B4 of a saturable reactor BR to be described shortly, and a second leg of rectifier G2 to the other terminal of secondary winding S4. These two circuits are made as nearly alike as possible, so that substantially the same value of current flows therethrough, the two secondary windings S2 and S4 delivering like voltages. As an aid in adjusting these two detector circuits, a core 59 of the adjustable reactance D1 may be adjusted as to its position with respect to the windings 66 and 68.

An output circuit is connected between these two balanced detector circuits and it can be traced from the mid terminal of winding A4 of the reactor AR through the left-hand portion of winding A4 and the right-hand portion of winding B4 of reactor BR to a mid terminal of winding B4. Also a wire 78 connects the two positive output terminals of rectifiers G1 and G2. It is clear that as long as the detector circuits are balanced there will be no potential difference between the mid terminals of windings A4 and B4 and no current flows in the output circuit, but an unbalanced condition of the detector circuits causes a difference of potential between the mid terminals of windings A4 and B4 and current flows in the output circuit, the current being a unidirectional current due to the rectification of rectifiers G1 and G2. When a vessel approaches mine M1 and causes a magnetic field, such field causes the flux threading core 62 to increase and that threading core 63 to decrease, or vice versa, and the impedances of windings 64 and 65 are varied with the result the detector circuits are unbalanced and current flows in the associated output circuit. This current thus created in the output circuit is used to govern the reactors AR and BR.

Reactor AR has a three-legged core structure of material of high permeability and it is provided with a circuit supplied with alternating current for transformer TM. Specifically, this reactor circuit extends from secondary winding S1 through winding A1, on one outside leg of reactor AR, winding A2 on the other outside leg of reactor AR, one arm of a full wave rectifier G3, resistor 69 to terminal 70, thence through a regenerative winding A3 mounted on the center leg of the core of the reactor AR, and a second arm of rectifier G3 back to the other terminal of secondary winding S1. The alternating current windings A1 and A2 are disposed for alternating flux to be set up in the outside legs of the core but not through the center leg which carries both windings A3 and A4, winding A4 being a regenerative winding. The number of turns for the right-hand portion of winding A4 is adjusted so that the rectified current flowing therethrough under the balanced condition of the associated detector circuit is sufficient to put the magnetic material of the core of reactor AR at its most sensitive condition.

Reactor BR is made as nearly as possible like the reactor AR, and is provided with a circuit extending from secondary winding S5 of transformer TM through winding B1 on one outside leg of its core, winding B2 on the other outside leg of the core, one arm of a full wave rectifier G4, resistor 71 to terminal 72, and thence through regenerative winding B3 on the center leg of the core and another arm of rectifier G4 to the other terminal of secondary winding S5. Windings B1 and B2 are disposed for alternating flux to be set up in the outside legs of the core, but not through the center leg which carries windings B3 and B4, winding B4 being a combined bias and output winding and winding B3 being a regenerative winding. The number of turns for the left-hand portion of winding B4 is adjusted so that the rectified current flowing therethrough under the balanced condition of the associated detector circuit is sufficient to put the magnetic material of the core of reactor BR at its most sensitive condition. Resistors 69 and 71 are alike, and hence the two reactor circuits are balanced circuits with the result there is substantially no potential difference between terminals 70 and 72, and detector relay R1 connected between these two terminals is normally deenergized. An unbalanced condition of the detector circuits causes unequal currents to flow through the bias portions of windings A4 and B4, and the bias on reactor AR is increased and that on reactor BR is decreased, or vice versa. Since current now flows in the output circuit portions of windings A4 and B4 due to the unbalanced condition of the detector circuits, the bias on reactors AR and BR is further increased on one and decreased on the other. Due to these changes in the fluxes of the two reactors, an unbalanced condition takes place in the two reactor circuits so that current increases in one circuit and decreases in the other and causes a difference in potential to appear across terminals 70 and 72, and relay R1 is energized when this difference of potential reaches a predetermined value. This unbalanced condition between the reactor circuits is further amplified due to the action of the regenerative windings A3 and B3, these windings A3 and B3 being so poled as to increase any unbalance in the reactor circuits that happens to appear.

It is therefore apparent that with no vessel present the circuits for the detector-amplifier for mine M1 of Fig. 2 are balanced and the detector relay R1 is deenergized, but that the approach of a vessel unbalances the circuits of the detector element to cause current to flow in the output circuit associated therewith and such output circuit current in turn serves to unbalance the associated reactor circuits, and relay R1 is energized, the unbalance of the reactor circuits being further amplified through the regenerative windings. Detector relay R1 of Fig. 2 when picked up to close front contact 40, completes the shunt circuit including filter 21X—21C across the line circuit the same as in Fig. 1.

An unbalanced condition in the detector circuits for the detector-amplifier of Fig. 2 may appear due to variations in the voltage of the power current. In order to prevent this, a winding has been added to each core of the detector element, winding 73 being mounted on core 62 and winding 74 on core 63. Secondary winding S3 of transformer TM is connected to windings 73 and 74 through a full wave rectifier G5. The windings 73 and 74 are poled and the current flowing therethrough is adjusted by resistance 75 so that when a change takes place in the applied alternating voltage, the change in the flux balance of cores 62 and 63 due to the change of the current through windings 73 and 74 will be substantially equal and opposite to that which would take place through windings 64 and 65, due to the change in the alternating voltage if windings 73 and 74 were not used.

Another characteristic of circuits of the nature here involved in the detector-amplifier, is that a perfect balance is difficult to maintain over long periods of time without periodic adjustment. The reason for this is not very well understood, but may be due to various minute changes in the magnetic material or in the insulation. To maintain at all times a perfect balance, special circuits supplied from secondary winding S6 of transformer TM are provided. The resistors 69 and 71 are preferably of the type that shows a considerable positive and negative temperature coefficient. The resistors 69 and 71 are enclosed inside heater windings H3 and H4, respectively. Winding H3 is connected to secondary winding S6 through a left-hand contact 76 of a relay RB, and winding G4 is connected to secondary winding S6 through a right-hand contact 77 of relay RB. Relay RB is a polar relay, the winding of which is connected across terminals 70 and 72 in multiple with the winding of relay RI. Relay RB is made much more sensitive than the detector relay RI, relay RB being operated on say 10% of the difference in potential between terminals 70 and 72 of that required to operate relay RI. As soon as an unbalance in the reactor circuits appears and the potential difference between terminals 70 and 72 is great enough to operate relay RB but is only about 10% of that required to operate relay RI, relay RB is operated to one position or the other. With relay RB thus operated, heat will be applied to resistor 69 or 71 as required to increase the unbalance that caused relay RB to operate. The change in the resistors 69 or 70 takes place at a very slow rate and if the unbalance of the reactor circuits is not one created due to the approach of a vessel a balance will be reached and then the correcting action will continue until an unbalance is created in the opposite direction great enough to operate relay RB in the opposite direction. When this happens the other heater winding is supplied with current and the unbalance is again reduced toward zero, with the result that the currents in the reactor circuits are being continually balanced and unbalanced at a very slow rate through the action of relay RB and its associated circuits, the unbalance of the reactor circuits never approaching, however, the point where the detector relay RI responds.

The arming relay R3 of mine MI of Fig. 2 receives current from the line circuit through filter FT31 and rectifier 42, the same as in Fig. 1, and hence this relay responds to current supplied by the control oscillator F31 at the office. Detonator D1 of mine MI of Fig. 2 is connected to the line circuit through filter FT4 and electron tube VI, the same as in Fig. 1, and thus responds to the firing current supplied by the oscillator F4 when control current is also present.

Normally, that is, when no vessel is near mine MI of Fig. 2, the detector and reactor circuits are balanced and the detector relay is deenergized. This balanced condition of the detector-amplifier is maintained through windings 73 and 74 when voltage variations of the power supplied from oscillator F1 takes place. Also, a balanced condition of the reactor circuits is maintained over a long period of time by the action of relay RB and its associated circuits. If a vessel approaches mine MI of Fig. 2, the magnetic condition created thereby causes the circuits of the detector element to become unbalanced and in turn cause an unbalanced condition of the reactor circuits with the result the detector relay RI is operated to connect the circuit path including filter 21X—21C across the line circuit causing an indication to be effected in the office in the same manner such indication was effected in Fig. 1. The operation of the apparatus of Fig. 2 for arming and firing the mine is the same as described in connection with the operation of the apparatus of Fig. 1. Also, the equipment of mine MI of Fig. 2 can be tested through the circuit path including front contact 43 of relay R3, the same as in Fig. 1.

Although I have herein shown and described but two forms of apparatus for selective control and indication systems embodying my invention, it is understood that various changes and modifications may be made therein within the scope of the appended claims without departing from the spirit and scope of my invention.

Having thus described my invention, what I claim is:

1. In a control and indication system, the combination comprising, a first and a second location; a line circuit having at least one metallic line conductor extending between said locations; an oscillator, a filter and a differential relay means at said first location; said oscillator to supply current at a preselected frequency, said relay means having a first and a second energizing element, said oscillator connected to said line circuit through said filter and said first element of the relay means to energize the relay means due to the charging current supplied to the line circuit as caused by the distributed capacitance of said line conductor, a local current source connected to said second element of the relay means to energize the relay means, said last mentioned energization of said relay means being opposite and substantially equal to that created by said charging current through said first element, a shunt circuit including a filter at said second location, said shunt circuit filter tuned to resonance at said preselected frequency, circuit means including a normally open contact to connect at times said shunt circuit across said line circuit to detune the line circuit to reduce the charging current supplied by said oscillator and create a given resultant energization of the relay means, and another circuit governed by said relay means in response to such resultant energization.

2. In a control and indication system, the combination comprising, a first and a second location, a line circuit including at least one metallic conductor extending between said locations; an oscillator, a filter and a relay at said first location; said oscillator to supply current of a preselected frequency and connected to said line circuit through said filter and a winding of said relay; said filter to tune the circuit formed by said oscillator, filter, relay winding and distributed capacitance of said line circuit with respect to ground to resonance at said preselected frequency to energize said relay by the line charging current supplied by said oscillator, a shunt circuit including capacitance and inductance at said second location, and means including a normally open contact to at times connect said shunt circuit across said line circuit to detune the line circuit to reduce said charging current for operating said relay by the variation thus created in its energization.

3. In a control and indication system, the combination comprising, a first and a second location, a line circuit to connect said locations and including a metallic conductor as one side of the circuit and the ground path as the other side of the circuit; an oscillator, a filter, a rectifier, a two winding relay and a direct current source at said first location; said oscillator to supply current of a preselected frequency and connected to said line circuit through said filter, rectifier and a first one of said relay windings, said filter disposed to tune such circuit connection and the line circuit with the distributed capacitance of said line circuit conductor to resonance at said preselected frequency to energize said relay due to the charging current supplied by said oscillator, said direct current source connected to a second one of the relay windings to create an energization of the relay opposite and substantially equal to that created by said charging current, another filter at said second location and tuned to resonance at said preselected frequency, means to at times connect said other filter to said line circuit to reduce said charging current and create a given resultant energization of the relay to pick up the relay, and another circuit at said first location including a contact of said relay.

4. In a control and indication system, the combination comprising, a first and a second location, a two conductor line circuit extending between said locations, an adjustable reactance means at said first location interposed in the line circuit to provide line circuit impedance equal to that for a line circuit of a given length; an oscillator, a filter, a rectifier, a two winding relay and a direct current source at said first location; said oscillator of a preselected frequency and connected to the line circuit through said filter, rectifier and a first one of the relay windings; said filter disposed to tune said oscillator connection and line circuit with its distributed impedance to resonance at said preselected frequency to provide a predetermined energization of the relay due to the charging current supplied by said oscillator, said direct current source connected to a second one of the relay windings to provide an energization opposite and substantially equal to that provided by said charging current, another filter at said second location tuned to resonance at said preselected frequency, means to at times connect said other filter to said line circuit to reduce the charging current supplied by said oscillator to provide a given resultant energization of the relay to pick up the relay, and another circuit at said first location including a contact of said relay.

ANDREW J. SORENSEN.